United States Patent
Rozinska

[11] 3,720,050
[45] March 13, 1973

[54] BLUEBERRY PICKER

[76] Inventor: Ralph E. Rozinska, 921 Lewis Avenue, St. Joseph, Mich. 49085

[22] Filed: Feb. 4, 1972

[21] Appl. No.: 223,448

Related U.S. Application Data

[63] Continuation-in-part of Ser. No. 876,244, Nov. 13, 1969, abandoned.

[52] U.S. Cl. .................56/330, 56/12.8, 56/13.3, 56/DIG. 8
[51] Int. Cl. ...........................A01g 19/00
[58] Field of Search..........56/12.8, 13.3, 328 R, 330, 56/30–32, DIG. 8

[56] References Cited

UNITED STATES PATENTS

| | | | |
|---|---|---|---|
| 1,400,522 | 12/1921 | Cannon | 56/30 |
| 3,006,131 | 10/1961 | McDowell | 56/330 |
| 3,276,194 | 10/1966 | Mohn et al. | 56/330 |
| 3,420,045 | 1/1969 | Holzmann | 56/330 |
| 3,449,895 | 6/1969 | Pertics | 56/330 |
| 3,455,502 | 7/1969 | Pool et al. | 56/328 R |

Primary Examiner—Louis G. Mancene
Assistant Examiner—J. A. Oliff
Attorney—Pierce, Scheffler & Parker

[57] ABSTRACT

A self-propelled blueberry picker with a deflector and cooperating means which may be reciprocally agitated to force the bushes outwardly and downward and including means to direct air streams against the bushes to aid in removing berries from the bushes into pickup arms which extend along opposite sides of the frame of the machine. The berries are conveyed by vacuum from the arms to a container wherein leaves and trash are separated from the berries.

10 Claims, 7 Drawing Figures

3,720,050

BLUEBERRY PICKER

This is a continuation-in-part of my application Ser. No. 876,244 filed Nov. 13, 1969 and now abandoned.

This invention relates to apparatus for picking berries from branched berry bushes arranged in rows. The machine finds particular utility in picking blueberries.

An object of this invention is to provide an improved blueberry picking machine wherein a plurality of cooperating elements coact to dislodge the berries from the bushes, direct their travel to pickup arms, separate the berries from accompanying trash and collect the berries.

Another object of the invention is to provide a machine having a deflector separating said bushes as the machine moves forward along the row, forcing said bushes outwardly and downwardly over pickup arms. The deflector also acts as a baffle for the air stream which is operative to separate the berries from the bushes, thus holding the branches out and over the pickup arms, while the air stream whips berries from said branches to either side. This separating action is augmented by the impingement of the bush branches against cooperating arms which oppose the deflector so that an average branch is either operated on by either the deflector or the cooperating arms. Hydraulic means are provided to raise and lower the deflector to suit the height of the bushes.

A further object of the present invention is to provide a machine in accordance with the preceding objects which has cooperating arms driven by motor means so that they have a reciprocatory or vibratory motion whereby they agitate the branches to shake the berries loose and hence cooperate with and augment the action of the air stream in removing the berries from the branches.

A further object of the present invention is to provide a machine in accordance with the preceding objects which has the pickup arms formed to fit under bushes, and move in and out with hydraulic push-pull cylinder attached, to hold suction cups on trays in place so that berries which are dislodged and roll down are caught and held close in to sustain opening of hoses for conveying to a holding container. The pickup arms also extend forwardly to a front pedestal, a distance of one bush, or three to five feet, so that any berries ripe enough to drop off bushes can be picked up by the pickup arms and cups thereby catching a high percentage that would otherwise be lost on the ground when deflector and front pedestal enters over said bushes. Also, the machine includes extra pickup arms to either side of the machine to collect any ripe berries that may be brushed off of an adjacent row.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
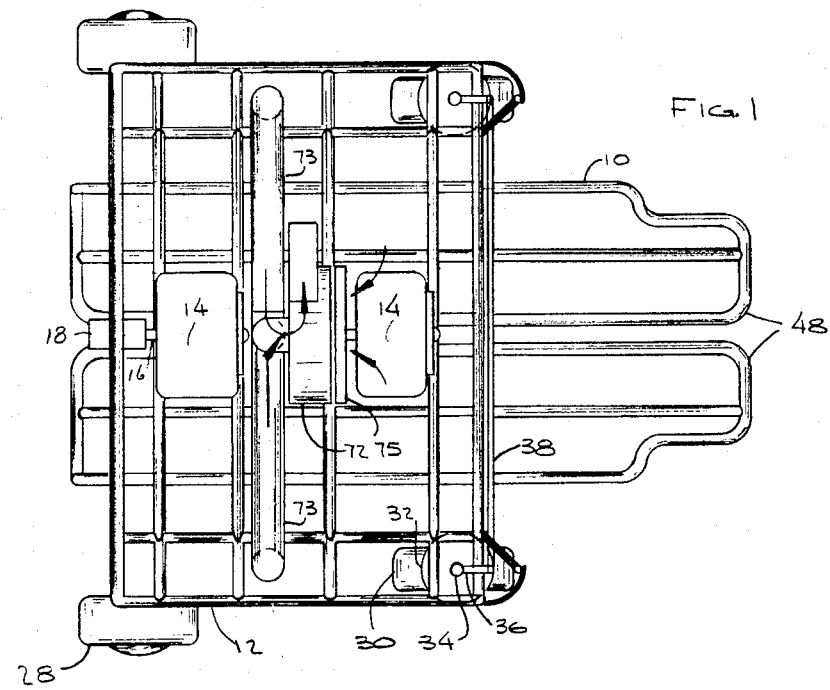
FIG. 1 is a top plan view of the blueberry picking machine.
Figure 2:
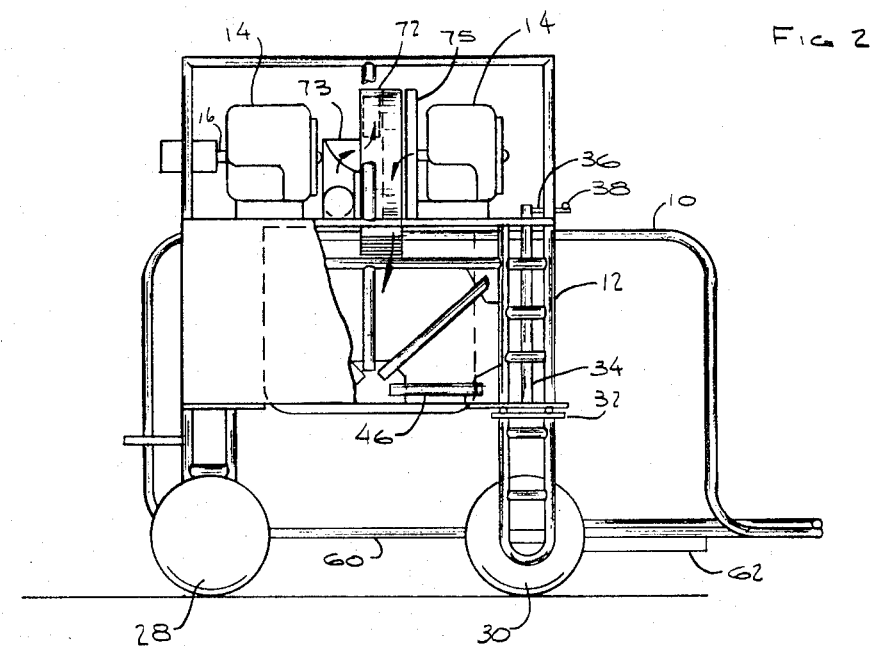
FIG. 2 is a side elevational view of the machine.

Referring now specifically to the drawings, the blueberry picking machine of the present invention is generally designated by numeral 10 and includes a self-propelled elevated tractor construction including elevated frame 12 supporting a prime mover 14 such as a suitable internal combustion engine having a power output shaft 16 extending into a gear box or differential having output axle and housing assemblies extending out from the opposite sides thereof into gear boxes from which depending drive assemblies 24 extend into lower gear boxes 26 which are drivingly associated with rear driving wheels 28 for propelling the machine in known manner.

The front wheels 30 are steerable; they are supported by a bearing assembly 32 and are controlled by a depending steering shaft 34 having an arm 36 extending laterally from the upper ends thereof. The arms are interconnected by a link 38 and a suitable steering mechanism is connected thereto. The various mechanisms for controlling the vehicle are not shown in detail inasmuch as conventional clutches, brakes, throttle control, seat, steering mechanism, gear shift, transmission and other related equipment employed on a tractor type vehicle are employed to enable the machine to traverse an area in which rows of bushes 40 are growing with ripe berries 42 thereon, for harvesting the berries.

Each of the wheels 28, 30 is supported from a depending pedestal 44 rigid with the frame 12 and rigidified fore and aft by bracing 46. All of the frame, pedestals and bracing preferably are constructed from tubular pipe with the components welded and braced where necessary.

Figure 5:
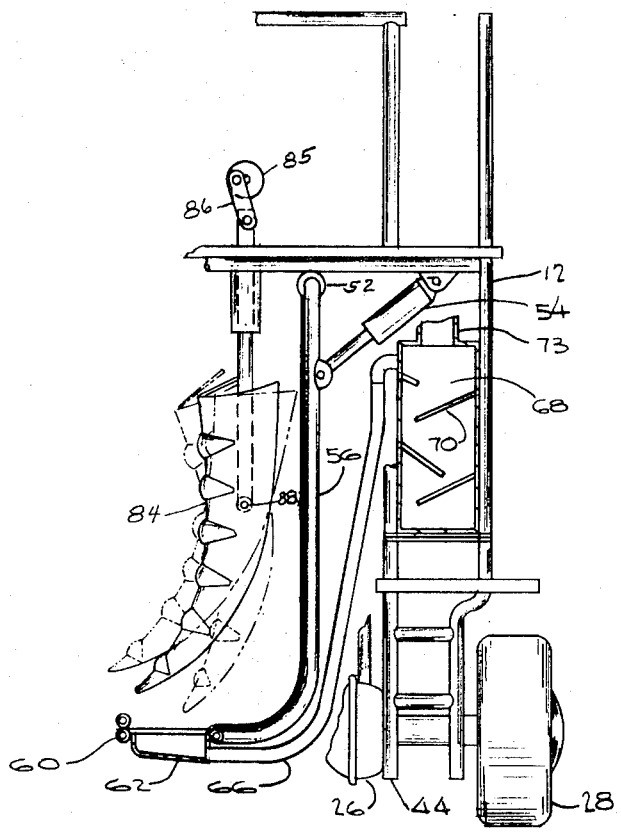
FIG. 5 is a detailed sectional view, on an enlarged scale, showing the details of one of the pickup arms and one of the cooperating arms.
Figure 6:
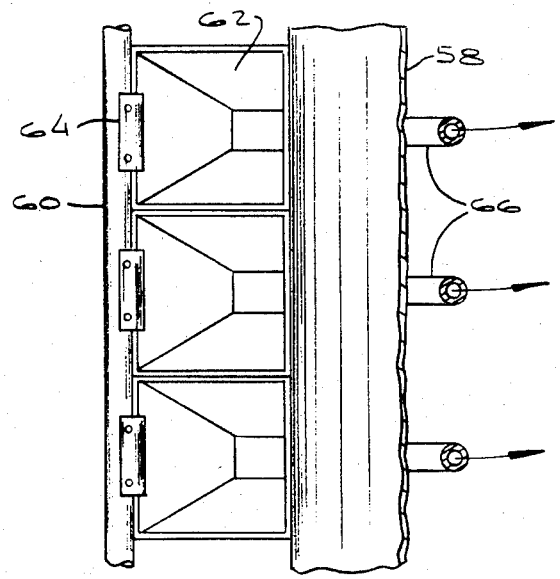
FIG. 6 is a plan sectional view of a portion of one of the pickup arms showing the suction trays and hoses.
Figure 7:
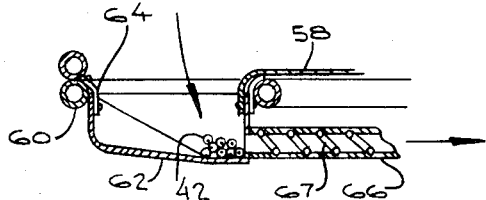
FIG. 7 is a detailed fragmental sectional view showing a suction tray and hose.

A pair of pickup arms 48, 49 are disposed longitudinally at each side of the frame 12, with each of the arms being hingedly supported from frame 12 at 52 with piston and cylinder assemblies 54 interconnecting the frame 12 and arms 48, 48 to laterally move the lower end of the arms inwardly and outwardly. Each pickup extends forwardly of the frame to collect berries which may be dislodged by movement of the machine. Each arm includes a tubular frame 56 extending downwardly and laterally in a smooth curve as seen in FIG. 5. Attached to frame 56 is a curved panel 58 of sheet material such as heavy duty plastic, canvas or the like. Also attached to the lower rail 60 of the frame 56 are a plurality of open-topped trays 62 mounted by suitable brackets 64 with the lower edge of the panel 58 attached to the inner upper edge thereof to discharge berries into the trays,- see FIGS. 6 and 7.

The lower portion of the inner wall of each tray 62 is connected with a flexible hose 66 having a spiral wire 67 embedded in the inner surface thereof to reinforce the hoses and initially separate leaves from the berries. The upper ends of the hoses 66 are connected with a vertically disposed container 68 supported from the pedestals and including a plurality of downwardly inclined vertically spaced baffles 70 secured to the side walls thereof for slowing the descent of the berries and further separating leaves and trash therefrom.

The containers 68 communicate with the inlet of a blower 72 carried by the frame 12 and driven by engine 14 or by a separate engine if desired. A separator 74 for removing the leaves and trash from the air communicates with the outlet of the blower 72. The blower 72 is a double intake blower with a discharge at the front and rear. The front intake communicates with the containers 68 through ducts 75 and the front discharge communicates with a dust or trash collector or separator 74. Suction induced in the containers 68 draws berries and some leaves from the trays 62 via hoses 66 into the containers. The rear intake of the blower 72 takes in clean air through an opening regulated as to size by sliding plates 75 mounted on each side of the blower shaft for varying the quantity of air discharged downwardly onto a deflector 76 and outwardly onto the bushes to dislodge the berries.

Figure 3:
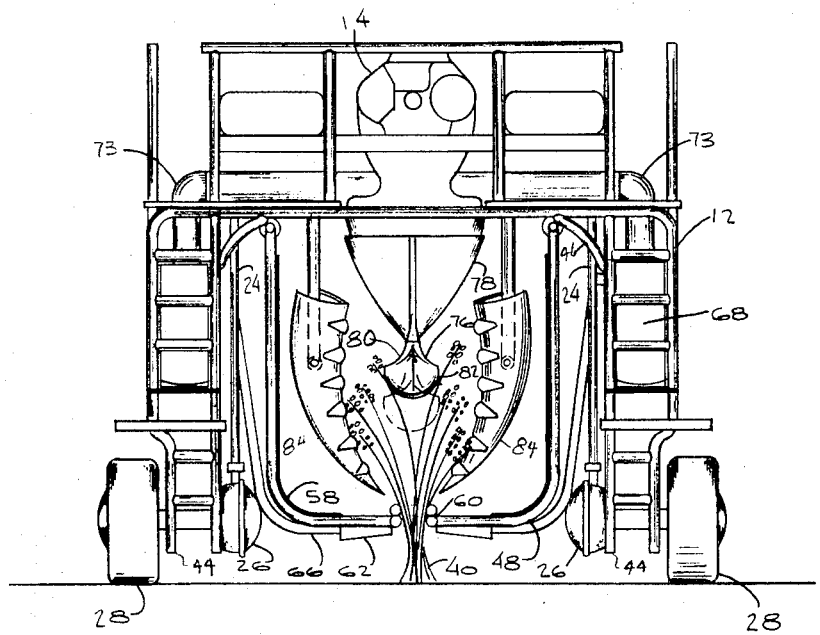
FIG. 3 is a rear end elevational view of the machine.
Figure 4:
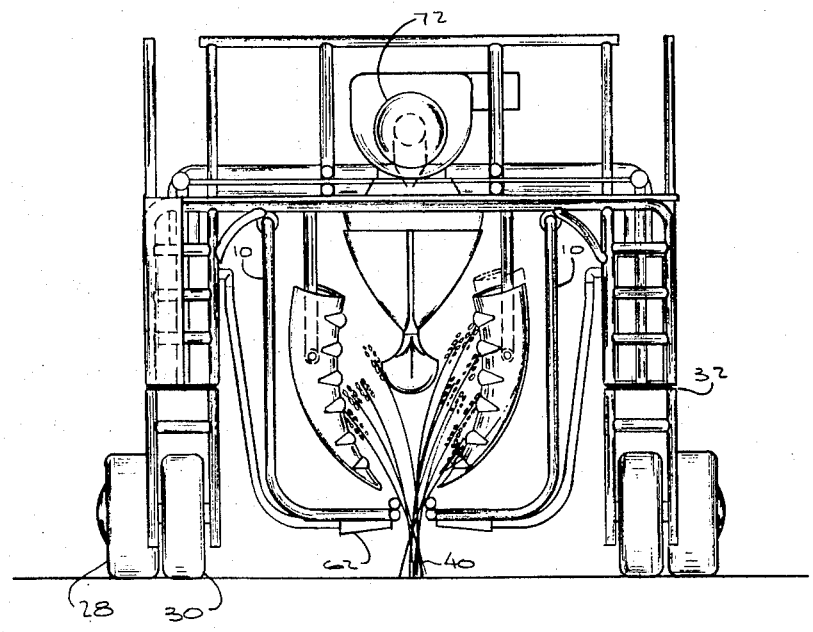
FIG. 4 is a front elevational view of the machine.

The deflector 76 is supported below the center of the frame 12 by a pair of piston and cylinder assemblies 78 for adjusting the height thereof. The deflector is elongated and has downwardly diverging and curved top walls 80 and downwardly converging and curved side and bottom walls 82 which engage the top portions of bushes 40 to deflect them outwardly and downwardly toward arms 84,- see FIG. 3,- so that the branches of the bushes are deflected by the opposed surfaces of both deflector 76 and arms 84. The upper surfaces 80 of deflector 76 deflect air streams discharged from blower 72 downwardly and outwardly through the bushes thereby in cooperation with deflector 76 and arms 84, dislodging berries and entraining them onto the air stream and depositing them against the facing surface of an opposed panel 58 for collecting the berries thereon for gravitational discharge into trays 62.

A feature of the invention which results in a significant improvement in the efficiency of berry removal from the bushes is shown in FIG. 5 wherein arm 84 is pivotally mounted on pivot 88 so that an oscillatory or vibratory motion may be imparted to arm 84 by crank 85 and arm 86 which are driven by any source of rotary motion such as prime mover 14 or an auxiliary hydraulic motor might be used. So arranged, the vibratory arms 84 agitate the branches of bushes 40 and cooperate with the air stream the more thoroughly to remove the berries from the branches. This action is accentuated by the presence of deflector 80 which tends to press the branches toward the vibratory arms to render the vibratory action more effective.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to.

What is claimed as new is as follows:

1. A machine for picking berries from branches of bushes arranged in rows, said machine comprising
    a mobile frame;
    means on said frame for driving and steering said frame for traversing along a row of such bushes carrying berries;
    means for removing berries from such bushes comprising the combination of mechanical means and pneumatic means;
    said mechanical means comprising the combination of a centrally positioned mechanical deflector which displaces the branches of such bushes downwardly and outwardly and cooperating arms outboard of said deflector against which the branches are displaced;
    said pneumatic means including a source of fluid pressure and means for directing jets of air downwardly and outwardly from an area centrally above the deflector and the bushes, so that the berries are dislodged from the bushes by the cooperating action of said mechanical and pneumatic means;
    means disposed outwardly of and below the deflector and the bushes for collecting berries dislodged by the combined action of said mechanical means and said pneumatic means, having such predetermined configuration that the dislodged berries pass by gravity to collector trays, and
    fluid means for transferring berries from said trays to a container which is maintained at subatmospheric pressure by said source of fluid pressure.

2. The machine defined in claim 1, wherein said mechanical deflector comprises a longitudinally extending body having downwardly converging wall surfaces engaging the central top area of the bushes for forcing the top portions of the bushes outwardly and downwardly toward said cooperating arms, and means for vertically adjusting the height of said mechanical deflector.

3. The machine defined in claim 2, wherein said cooperating arms are pivotally mounted on said frame in combination with driving means for imparting an oscillating or reciprocating motion to said cooperating arms so that the branches of the bush are mechanically agitated.

4. The machine defined in claim 3, wherein said deflector has downwardly diverging top surfaces which control the directions of said air jets downwardly and outwardly through the branches of the bushes for further dislodging berries therefrom.

5. The machine defined in claim 4, wherein said collecting means includes a pair of downwardly and inwardly extending pickup arms supported from said frame, each pickup arm including a longitudinally elongated panel extending laterally from an area below the bushes to an area alongside of the top portion of the bushes for receiving berries dislodged from the bushes.

6. The machine defined in claim 5, wherein each pickup arm supports a generally upright panel for guiding the gravitational descent of dislodged berries to a plurality of said collector trays.

7. The machine defined in claim 6, wherein said collector trays are provided with suction conduits communicating between said collector trays and said container.

8. The machine defined in claim 7, wherein each of said pickup arms is pivotally supported from the frame for swinging movement about a longitudinal axis above the bushes, said machine further comprising means interconnecting the pickup arms and the frame for swinging the lower ends of the pickup arms toward and away from the bottom of the bushes.

9. The machine defined in claim 8, wherein each pickup arm extends forwardly of the frame to collect berries which may be dislodged by movement of the machine.

10. The machine defined in claim 9, wherein said container is vertically elongated and is provided with a plurality of vertically spaced baffles to separate leaves from berries.

* * * * *